United States Patent [19]

Shibata

[11] Patent Number: 5,353,428

[45] Date of Patent: Oct. 4, 1994

[54] INFORMATION PROCESSING APPARATUS IN WHICH A CACHE MEMORY CAN BE OPERATED IN BOTH STORE-IN AND STORE-THROUGH MODES

[75] Inventor: Masabumi Shibata, Kawasaki, Japan

[73] Assignee: Hitachi, Ltd., Tokyo, Japan

[21] Appl. No.: 63,953

[22] Filed: May 20, 1993

Related U.S. Application Data

[63] Continuation of Ser. No. 549,074, Jul. 6, 1990, abandoned.

[30] Foreign Application Priority Data

Jul. 6, 1989 [JP] Japan ................................. 1-174405

[51] Int. Cl.⁵ ............................................. G06F 12/12
[52] U.S. Cl. ................................ 395/425; 364/243.41;
364/964.2; 364/964.541; 364/DIG. 1;
364/DIG. 2
[58] Field of Search ... 364/200 MS File, 900 MS File;
395/400 MS, 425 MS

[56] References Cited

U.S. PATENT DOCUMENTS

| | | | |
|---|---|---|---|
| 4,484,267 | 11/1984 | Fletcher | 395/425 |
| 4,755,930 | 7/1988 | Wilson, Jr. et al. | 395/425 |
| 4,797,814 | 1/1989 | Brenza | 395/425 |
| 4,885,680 | 12/1989 | Anthony et al. | 395/400 |
| 4,905,141 | 2/1990 | Brenza | 395/425 |
| 5,008,813 | 4/1991 | Crane et al. | 364/200 |
| 5,010,475 | 4/1991 | Hazawa | 364/200 |
| 5,023,776 | 6/1991 | Gregor | 395/425 |
| 5,091,846 | 2/1992 | Sachs | 395/250 |

Primary Examiner—Joseph L. Dixon
Assistant Examiner—Reba I. Elmore
Attorney, Agent, or Firm—Antonelli, Terry, Stout & Kraus

[57] ABSTRACT

In an information processing apparatus composed of two or more processor units each including a cache memory and a processor which accesses stored data via the cache memory, and a main storage, a cache memory control method in which, using information concerning control object data, such as identification of a storage area and whether or not the data are program data, a judgment is made as to whether or not the data has a high possibility of being used by another processor. If the data has a high possibility of being used by another processor, the cache memory is controlled by the store-through system. If the data has a low possibility of being used by another processor, the cache memory is controlled by the store-in system.

19 Claims, 10 Drawing Sheets

INFORMATION PROCESSING APPARATUS IN WHICH A CACHE MEMORY CAN BE OPERATED IN BOTH STORE-IN AND STORE-THROUGH MODES

This application is a continuation of application Ser. No. 07/549,074 filed Jul. 6, 1990, now abandoned.

BACKGROUND OF THE INVENTION

1. Field of the Invention

This invention relates generally to an information processing apparatus using a multiple-processor system, and more particularly to a cache memory control method in such information processing apparatus.

2. Description of the Related Art

Heretofore, the store-through system and the store-in system are known as cache memory control methods in an information processing apparatus. The store-in system and the store-through system are also called "write-back or write-in system" and "write-through system", respectively. A cache memory is also called "buffer storage". The store-through system is a method for progressively updating both a cache memory and a main storage when a request to write into the main storage is issued. The store-in system is a control method for updating only the cache, when a request to write is issued, and thereafter collectively writing back to the main storage. The store-through system and the store-in system are exemplified by Computing Surveys Vol. 14 No. 3, September 1982, pages 500–502. When an information processing apparatus uses a cache memory control method, whether to use the store-through system or to use the store-in system is a significant factor of a logical system in the information processing apparatus and has a great influence on its performance.

Generally, the store-through system is disadvantageous, compared to the store-in system, in that it is complex to control so that the quantity of hardware increases. But since it is capable of reducing the frequency of transfer with the main storage, the store-through system is suitable for, for example, closely joined multiple processors which share one main storage with another processor.

Here assume that in a multiple-processor system in which one main storage is shared by a plurality of processors, an area in the main storage is used as a common data area, and the individual processors are equipped with respective cache memories using the store-in system.

In this case, if the first processor reads from a cache memory a block belonging to this common area and writes the block back in the cache memory, the latest data would exist only in the cache memory of the first processor. And, the data of the main storage will be old data until it is written.

At that time, for the second processor to access the data belonging to this block of the common area, the second processor must read the block to access its own cache memory after the entire data of the block which are stored in the first cache memory have been written back to the main storage. To write this cache memory data back to the main storage is overhead which is inevitable with the store-in system.

Like the common data area, the write-back will frequently occur with the data which are shared by the multiple processors. Therefore, the overhead will increase to lower the performance of the multiple-processor system.

Then assume that in a multiple-processor system in which one main storage is shared by a plurality of processors, the individual processors are equipped with respective cache memories using the store-through system.

In this case, it is sufficient that a peculiar data area dedicated for use by a particular job or task exists only in the cache memory in a specified processor while the job runs by the processor. However, since the corresponding main storage data are updated every time writing into this peculiar data area occurs, the frequency of the main storage transfer will increase to lower the performance of the multiple-processor system.

Therefore, either of the store-in and store-through systems is unsuitable as a control method under certain situations to thereby lower the performance of the multiple-processor system.

SUMMARY OF THE INVENTION

It is therefore an object of this invention to provide a cache memory control method, in an information processing apparatus using a multiple-processor system, in which method a cache memory is desirably controlled, without lowering the performance of the multiple-processor system under various situations.

Another object of the invention is to provide an information processing apparatus which is able to realize such a cache memory control method.

According to a first aspect of the invention, there is provided a cache memory control method in an information processing apparatus composed of two or more processor units each including a cache memory and a processor which accesses stored data via the cache memory, and a main storage, wherein from information concerning control object data, such as a storage area and whether or not the data are program data, a judgment is made as to whether or not the data are high in possibility of being used by another processor. If the data are high in possibility of being used by the other processor, they are controlled by the store-through system. If the data are low in possibility of being used by the other processor, they are controlled by the store-in system.

Namely, if the store-in system is used, for the data with which a write-back due to the use of the other processor is expected to occur, the cache memory is controlled by the store-through. For the data of the block with which there is the low possibility that a write-back could occur, the cache memory is controlled by the store-in system.

It is thereby possible to minimize the frequent occurrence of write-back of the block to which the data that is expected to be subject to the occurrence of write-back due to the use of the other processor belong, and it is also possible to restrict the frequent transfer of the data of the main storage for needless updating of the main storage.

According to a second aspect of the invention, there is provided an information processing apparatus comprising: two or more processor units each including a cache memory and a processor which accesses stored data via the cache memory; and a main storage; each of the processor units including (i) discriminating means for discriminating, based on information concerning data to be written (for example, the type of the stored data and the area in the storage space), as to according to which one of the store-through and store-in systems the data are to be written in the cache memory, and (ii) writing means for writing the data in the cache memory by the discriminated one of the systems.

Accordingly, by writing the data into the cache memory by the suitable system according to the characteristic of the data to be written, it is possible to restrict lowering of the performance of the multiple-processor system.

The above and other advantages, features and additional objects of this invention will be manifest to those versed in the art upon making reference to the following detailed description and the accompanying drawings in which a certain preferred embodiments incorporating the principles of this invention are shown by way of illustrative example.

DETAILED DESCRIPTION

Various embodiments of this invention will now be described in detail with reference to the accompanying drawings.

Figure 1:
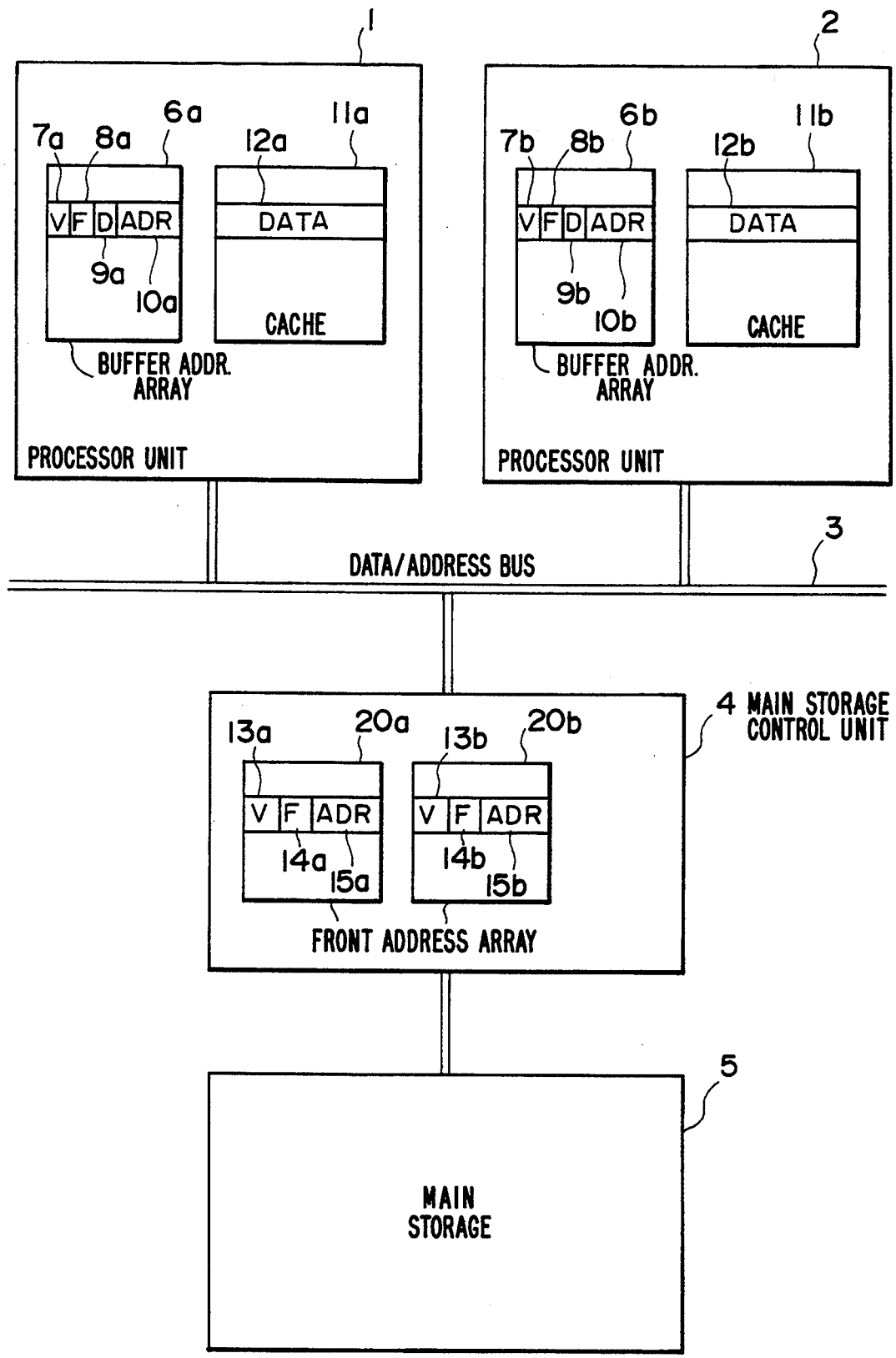
FIG. 1 is a block diagram showing an information processing apparatus according to a first embodiment of this invention.

FIG. 1 shows an information processing apparatus according to a first embodiment of this invention, in which two processor units share one main storage via a main storage control unit.

In FIG. 1, reference numerals 1, 2 designate processor units; 11a, 11b, cache memory data sections; and 6, 6b, buffer address arrays for managing, in units of blocks, data held by the cache memories 11a, 11b. The buffer address arrays 6a, 6b respectively store, for every block, valid bits (V bits) 7a, 7b indicating that the block is valid, store-in flags (F bits) 8a, 8b indicating the store-through and store-in attributes of the block, dirty bits (D bits) 9a, 9b indicating that block data 12a, 12b held by cache memory data sections 11a, 11b have been rewritten during the store-in controlling, and block real addresses 10a, 10b. Reference numeral 4 designates a main storage control unit; and 20a, 20b, front address arrays for managing the holding state of the cache memories for every processor unit connected to the main store control unit 4. The front address arrays 20a, 20b are substantially identical in construction with the buffer address arrays 6a, 6b, and respectively store valid bits (V bits) 13a, 13b, store-in flags (F bits) 14a, 14b, and block real addresses 15a, 15b.

Figure 2:
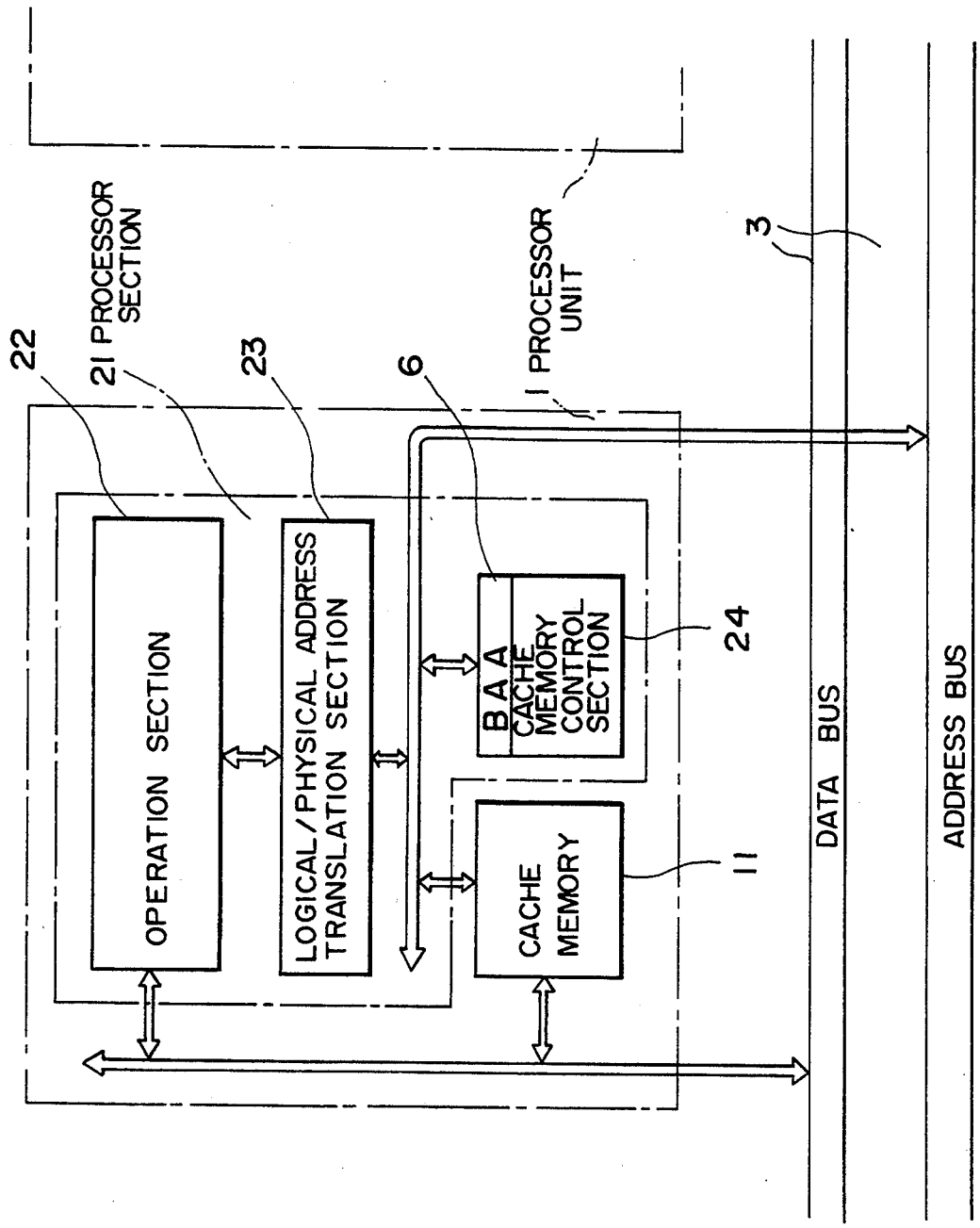
FIG. 2 is a block diagram showing a processor unit of the first embodiment.

The processor unit 1, as shown in FIG. 2, includes a processor section 21, and a cache memory 11 which is a buffer for temporarily holding the data of the main storage and supporting quick access to the stored data of the processor section 21. The processor unit 21 has an operation section 22 for executing operation processes, for example, to access a storage space by a logical address. Reference numeral 23 designates a logical/physical address translation section for translating a logical address to a real address to enable access to a main storage of the operation section 22. Reference numeral 24 designates a cache memory control section for controlling the cache memory 11 by using the buffer address array 6 (6a, 6b in FIG. 1).

Figure 3:
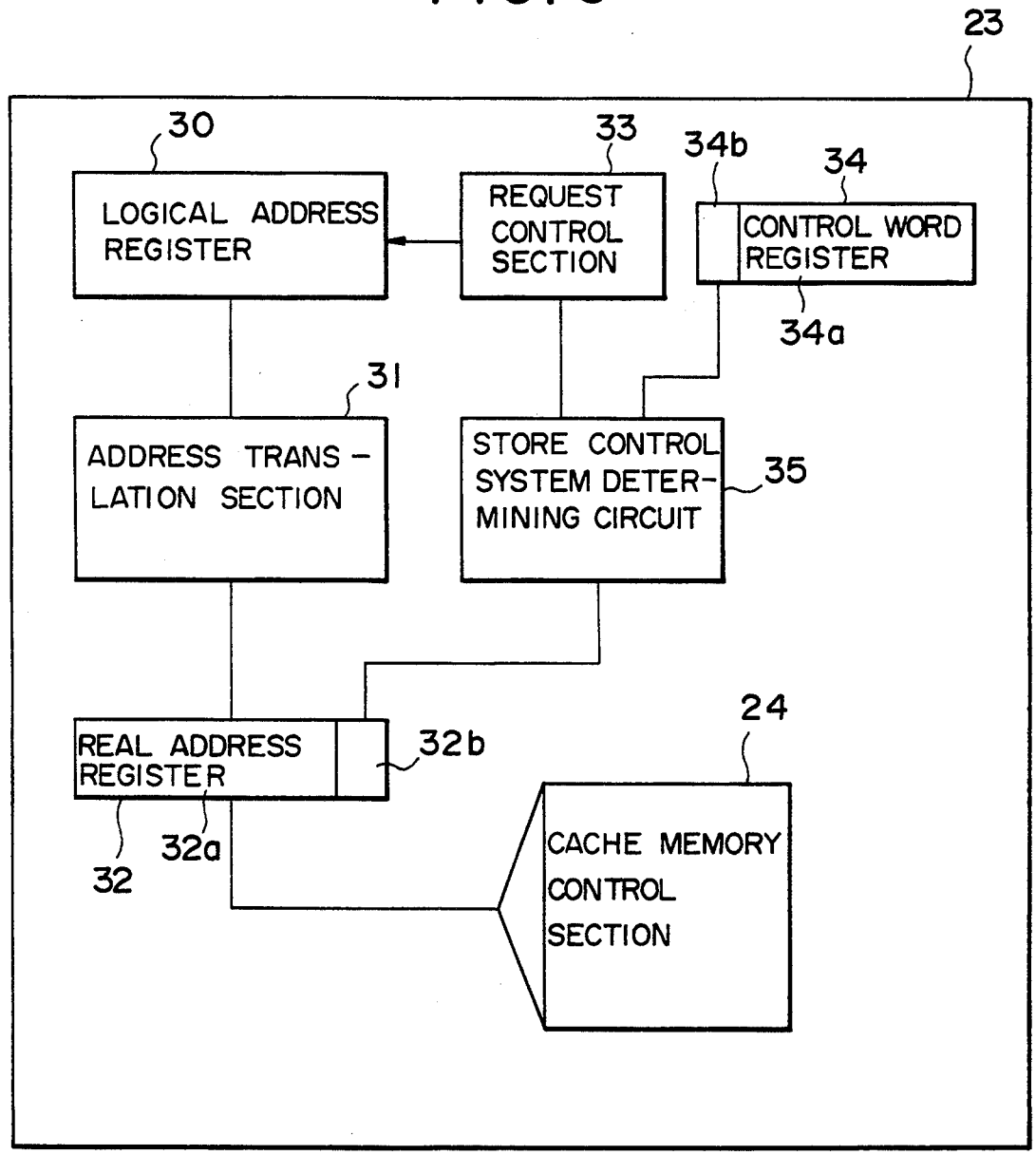
FIG. 3 is a block diagram showing a logical/physical address translation section of the first embodiment.

FIG. 3 shows the detailed construction of the logical/physical address translation section 23. In FIG. 3, reference numeral 33 designates a request control section for receiving an access request to the stored data from the operation section 22; 30, a logical address register for setting, by the request control section 33, a logical address of the stored data to be accessed; 31, an address translation section for actually translating a logical address into a real address; and 32, a real address register in which the translated read address is to be stored. The real address register 32 stores a store identification code 32b, which indicates an attribute of store-in or store-through, of the space associated with a preset real address or of the stored data corresponding to the real address. Reference numeral 34 designates a control word register for setting a control word so that the operation section notifies the control of various sections. The control word includes a space control bit 34b indicating the control content of every storage space. Reference numeral 35 designates a store control method determining circuit for determining an attribute of store-in or store-through of the block to which the stored data requested to be accessed belong and setting the store identification code in the real address register 32, from the kind of the access request from the operation section 22 received by the request control section 33, and from a space control bit 34a set in the control word register 34.

The operation of the information processing apparatus of the first embodiment will now be described, as particularly in the case where a request for operating data issues in the processor unit 1 (FIGS. 1 and 2). Specifically, the operation of the logical/physical address translation section 23 will be described in connection with FIG. 3.

In the processor unit 1, a request instruction for operating data issues and is set in the request control section 33. When a control word 34a is then set in the control word register 34, the request control section 33 sets in the logical address register 30 an logical address of the data contained in the request.

The logical address set in the logical address register 30 is translated into a real address by the address translator 31 and is set in the real address register 32. Meanwhile, the store control method determining circuit 35 reads the space control bit 34b and an instruction from the control word register 34 and the request control section 33, respectively.

If the kind of the read instruction is for reading data including a program such as of instruction fetching, if the logical addresses of the data contained in the instruction is on a common segment, and if the read space control bit 34*b* indicates a primary space access, the store identification code 32*b* is set as store-through. In other cases, the store identification code 32*b* is set as store-in.

However, in the information processing apparatus using the multiple virtual storage method, one virtual storage space provided to one process will in many cases be further provided as a plurality of subdivided virtual spaces. In such case, of these subdivided virtual spaces, one virtual space which a process uses and in which a program is stored, and another virtual space in which data concerning the program are stored might be supported so as to be simply accessed by the process. Usually, the former virtual space, in which the program is stored, is called "primary space", and the latter virtual space, in which the data concerning the program are stored, is called "secondary space".

The operation of the cache memory control section 24 when reading a request for data operation of the processor unit 1 will now be described.

Figure 6:
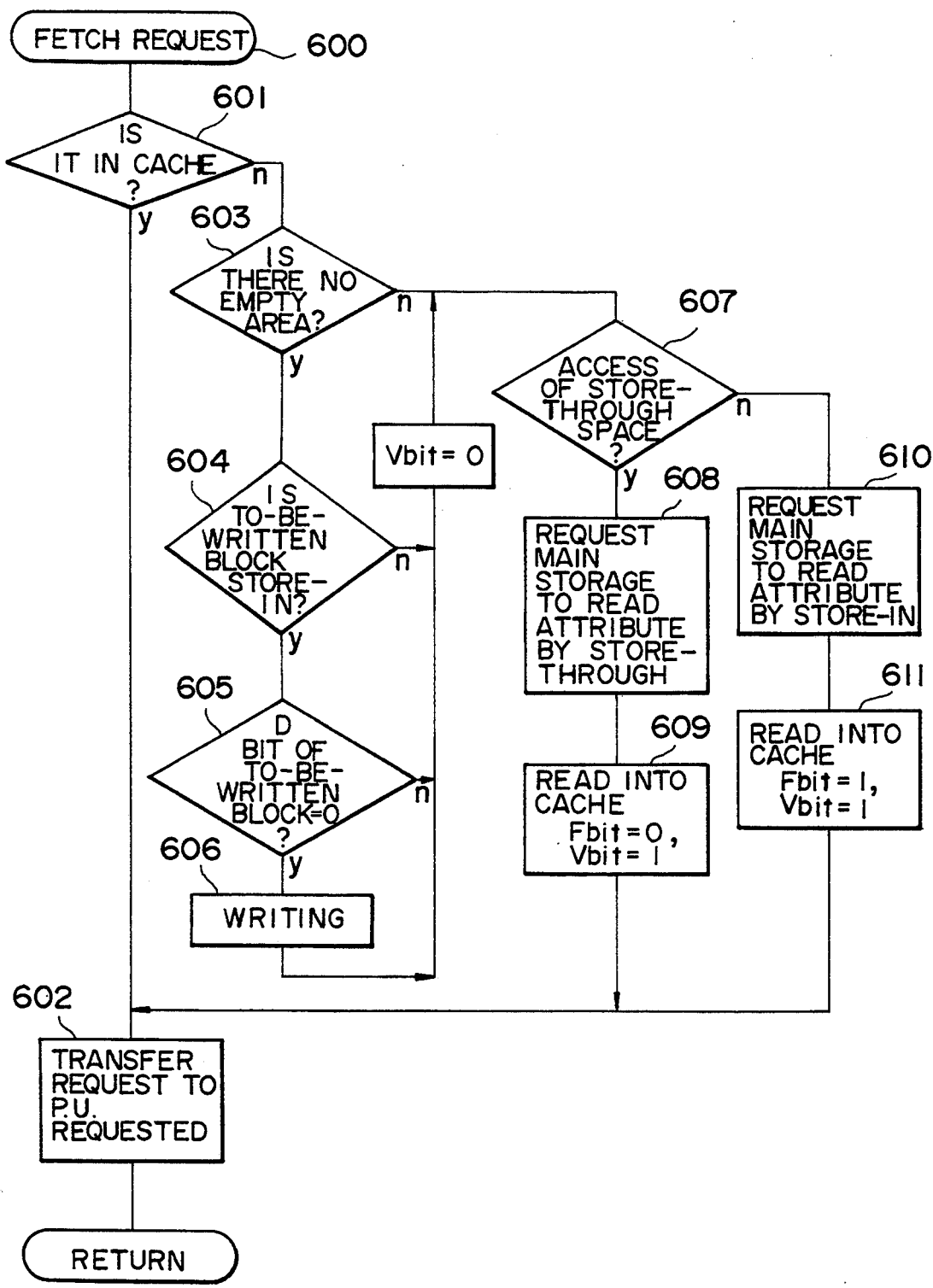
FIG. 6 is a flowchart showing the operation of a cache memory control section according to one example of the invention.

As shown in FIG. 6, when an real address is set in the real address register 32 (step 600), the cache memory control section 24 examines whether or not the data associated with the address of the real address register 32 exist in the cache memory (step 601).

If it exists, the cache memory control section 24 reads the data from the cache memory, transfers to the processor unit 1 (step 602), and terminates the process. If it does not exist, the cache memory control section 24 examines whether or not any empty block in which data block containing the data are read from the main storage 5 is present in the cache memory (step 603).

If there is an empty block, the cache memory control section 24 reads a store identification code 32*b* from the real address register 32 (step 607), and if the code indicates store-in, the control section 24 requests the main storage control section 4 to read this block (step 608), with the attribute of the data block containing the real address indicated by the real address register 32 being store-in.

If the code indicates store-through, the control section 24 requests the main storage control section 4 to read this block (step 610), with the attribute of the data block containing the real address indicated by the read address register 32 being store-through.

Upon receipt of the data block requested from the main storage control section 4, the cache memory control section 24 stores the data block in an empty block of the cache memory. The control section 24 sets a real address of the main storage 5 at a corresponding portion of the stored block of the buffer address array and also sets a V bit 7*a* as '1', thereby registering the block. If the read attribute is store-in, an F bit 8*a* is set as '0', and if the read attribute is store-through, an F bit 8*a* is set as '1' (steps 609 and 611).

Then the control section 24 transfers the data associated with the real address, which is requested by the data block stored in the cache memory, to the processor unit 1 (step 602) and terminates the process.

If there is no empty block for reading the data block from the main storage 5, the data block to be written from the cache memory is determined by the ordinary replacement algorithm.

If F bit 8*a* of the block to be written is '1', namely, indicates store-through (step 604), the control section 24 deletes the registration of the cache memory to form an empty block and requests the main control section 4 to delete the registration of the front address array of the block.

If F bit 8*a* of the block to be written is '0', namely, indicates store-in, the control section examines D bit 9*a* (step 605), and if the D bit 9*a* is '0', the data of the block are identical with the data corresponding to the block of the main storage 5. Therefore, the control section 24 sets V bit 7*a* of the block to '0' to delete the registration of the cache memory, thereby forming an empty block, and requests the main storage control section 4 to delete the registration of the front address array of the block.

If D bit 9*a* is '1', the data of the block is modified on the cache memory and indicates that this modification has not yet reflected on the main storage 5. Therefore, the control section 24 requests the main storage control section 4 to request for writing of the block, performs writing into the main storage 5 (step 606), then sets V bit 7*a* to '0', and deletes the registration of the cache memory, thereby forming an empty block.

As described below, in the storage control section 4 which has been requested to write the block of the store-in attribute, the registration of the front address array of the block is deleted.

After the empty block has been formed, the control section 24 executes the process in the case of empty block, stores the target data block in the cache memory, transfers to the processor unit 1 the data associated with the requested real address, and terminates the process.

The operation of the main storage control section 4 in the case where a request for operating the data is issued in the processor unit 1.

Figure 7:
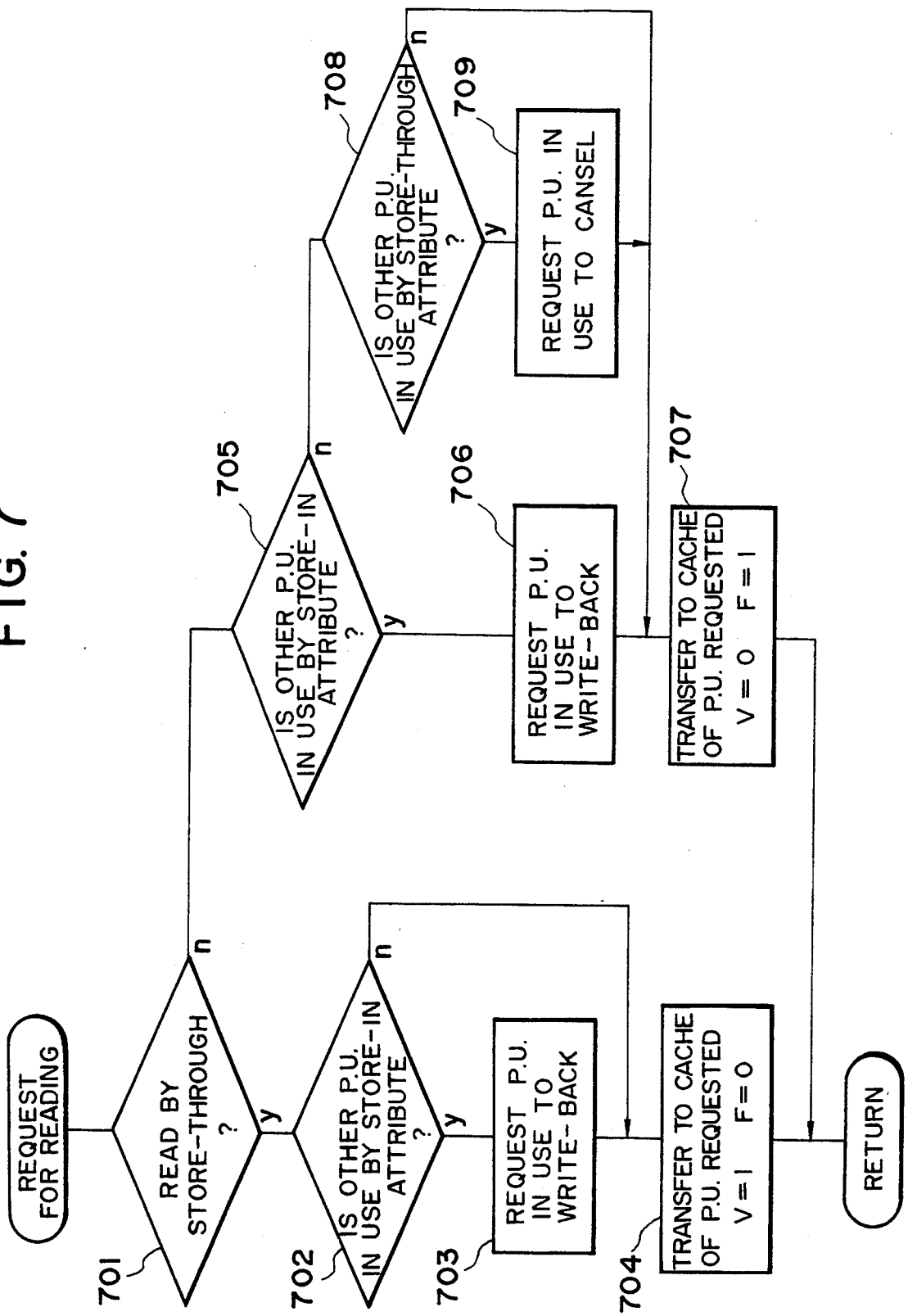
FIGS. 7 and 8 are flowcharts showing the operation of a main control section according to another example of the invention.
Figure 8:
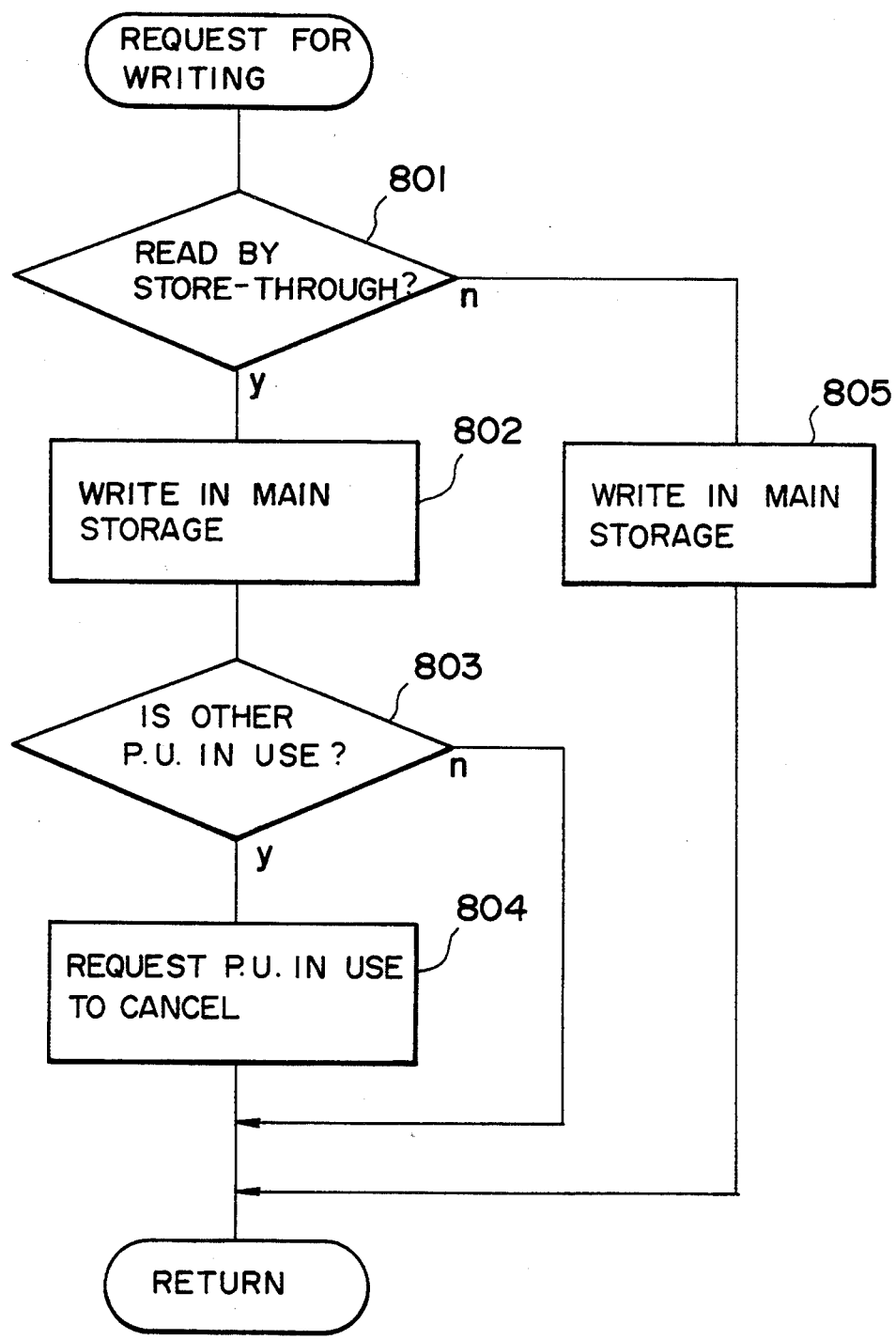

The main storage control section 4 starts by a reading request or a writing request from the cache memory control section 24 to execute the requested process. FIG. 7 shows the flow of process during requesting the reading, and FIG. 8 shows the flow of process during requesting the writing.

Firstly, the process during requesting the reading will be described. Upon receipt of the reading request from the cache memory control section 24 when the request for data is issued in the processor unit 1, the main storage control section 4 discriminates the attribute of the reading request (step 701 ).

If the attribute of the reading request is store-through, the cache memory control section 24 examines whether or not the requested block has been read in another processor unit 2 by the store-in attribute by examining the front address array 20*b*, which corresponds to the processor unit 2, based on the read address 13*b* and the V bit 13*b* (step 702). If the requested block has been read, the control section 24 requests the other processor unit 2 for writing back. This is because with the other processor unit 2, the data of the block have possibly been changed.

Upon execution of writing-back, the control section 24 deletes the registration of the data block, with the V bit 13*b* of the written back block of the front address array 20*b* corresponding to the other processor unit 2 being '0' (step 703).

If the block has been read in the other processor unit 2 by the store-through attribute, if the block has not been read in the other processor unit 2 or if the writing-back process in the case of store-in has been completed, the control section 24 reads the requested block from the main storage 5, transfers it to the requesting processor unit 1 (step 704), causes the V bit 13*a* of the transferred block of the front address array 20*a*, which corresponds to the processor unit 1, to assume '1' to register the block, sets F bit 14a to '0', and terminates the process.

Specifically, at that time, the same block of the store-through attribute possibly exists in two separate processor units. This is allowed because the read block will possibly be updated in the individual processor unit. However, as described below, if writing is performed in the block, the block of the other processor unit will be canceled.

If the attribute of the reading request is store-in, the cache memory control section 24 examines whether or not the requested block has been read by the other processor unit 2 by the store-in attribute (step 705), and also examines whether or not the requested block has been read by the store-through attribute (step 708).

If it has been read by store-in, the control section 24 requests the other processor unit 2 to perform writing back. When writing back has been executed, the control section 24 deletes the registration of the data block, with V bit 13b of the written-back block of the front address array 20b corresponding to the other processor unit 2 being '0' (step 706).

If it has been read by store-through, the control section 24 requests the other processor unit 2 to delete the registration of the block (step 709), with the V bit 13b of the block of the front address array 20b corresponding to the other processor unit 2 being '0'.

If the requested block has not been read by the other processor unit 2, or when the process to request for writing-back or deletion of registration has been completed, the control section 24 reads the requested block from the main storage 5, transfers it to the requesting processor unit 1, sets the V bit 13a of the transferred block of the front address array 20a corresponding to the processor 1 to '1' and F bit 14a to '0' (step 707), and terminates the process.

The operation of the main storage control section 4 when a writing request is issued from the cache memory control unit 24 will now be described with reference to FIG. 8.

In the presence of a writing request, the main storage control section 4 examines the attribute of the block requested to be written (step 801). If the attribute of the block requested to be written is store-through, the main storage control section 4 writes the block in the main storage 5 (step 802).

Then the main storage control section 4 examines whether or not the other processor unit 2 has read the same block as the block written in the main storage 5 (step 803).

If it is positive, the main storage control section 4 requests the other processor unit 2 to delete the registration of the block, sets V bit 13b of the block of the front address array 20b corresponding to the other processor unit 2 to '0', and terminates the process (step 804). This is in order that the other processor unit 2 prevents the use of data of the read block before the data have been changed.

If the attribute of the block requested to be written is store-in, the main storage control section 4 writes the block in the main storage 5, sets V bit 13a of the block of the front address array 20a corresponding to the processor unit 1, which has made a writing request, to '0', and terminates the process (step 805). At that time, as described above in connection with the process during reading request of the main storage control section 4, since the block read in one processor unit by the store-in attribute is never read by the other processor unit 2, it is unnecessary to think over the other processor unit 2.

The operation of the cache memory control section 24 when a request for operating data of the processor unit 1 is written will now be described.

Figure 9:
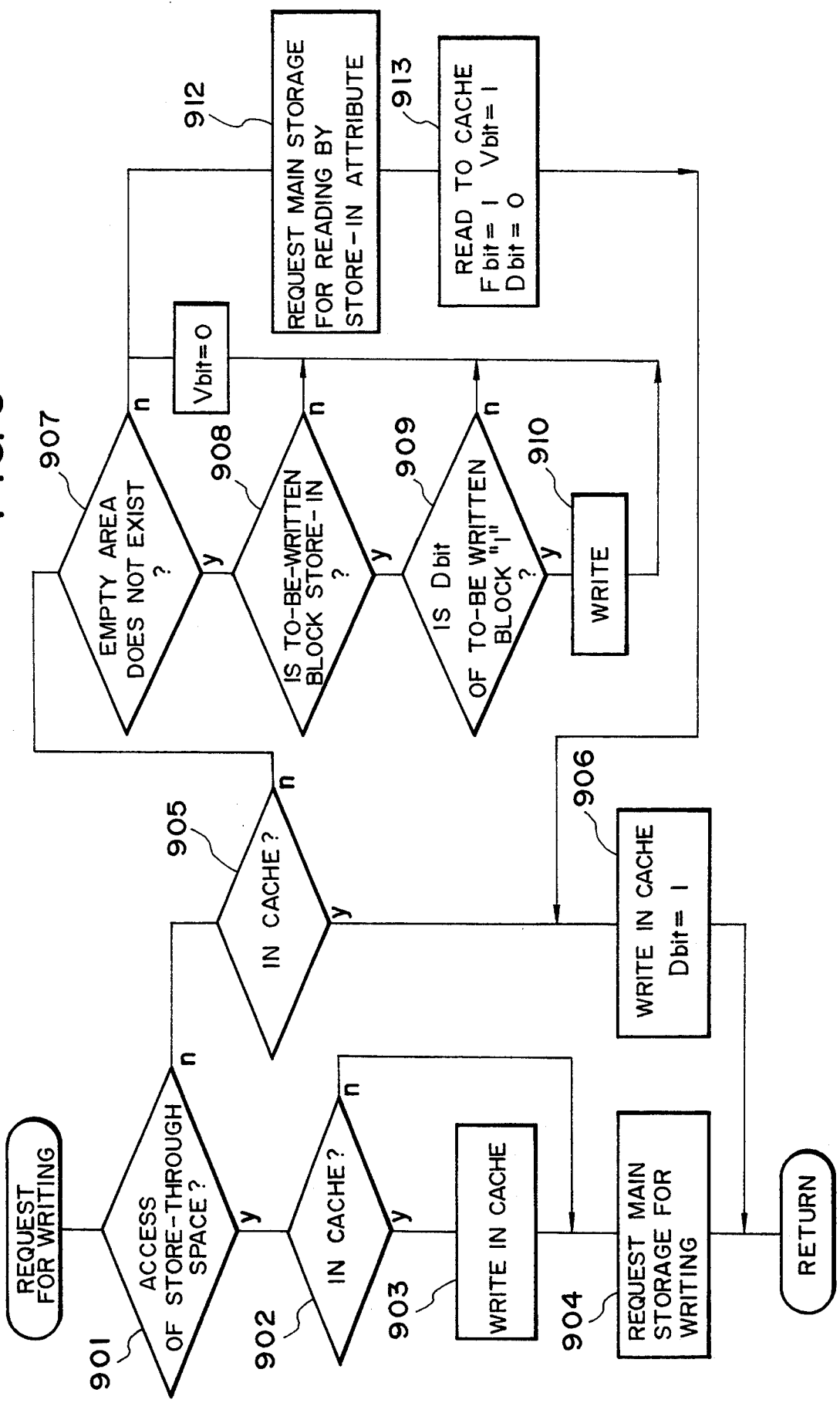
FIGS. 9, 10 and 11 are flowcharts showing the operation of the cache memory control section according to still another example of the invention.

FIG. 9 shows the flow of operation of the cache memory control section 24. when a real address is set in the real address register 32, the cache memory control section 24 reads a store identification code 32b to discriminate whether or not the code indicates store-through (step 901).

If the read store identification code 32b indicates store-through, the cache memory control section 24 examines whether or not the block containing the data corresponding to the address of the real address register 32 exists in the cache memory. If the block exists in the cache memory, the control section 24 writes it in the cache memory (step 903).

If the block does not exist in the cache memory, the control section 24 requests the main storage control section 4 for writing (step 904) and terminates the process.

If the read store identification code indicates store-in, the control section 24 examines whether or not the block containing the data corresponding to the address of the real address register 32 exists in the cache memory (step 905). If the block exists in the cache memory, the control section 24 writes the block in the cache memory, sets D bit 9a of the block of the buffer address array to '1' (step 906), and terminates the process.

If it does not exist in the cache memory, the cache memory control section 24 examines whether or not any empty block in which the data block containing the data is present in the cache memory (step 907). If there is an empty block, the control section 24 requests the main storage control section 4 for reading (step 12), with the attribute of the data block containing the real address indicated by the read address register 32 being store-in.

Upon receipt of the requested data block from the main storage control section 4, the cache memory control section 24 stores the data block in the empty block of the cache memory, registers a real address of the main storage 5 in the corresponding portion of the stored block of the buffer address array, sets V bit 7a to '1' and F bit 8a to '1' (step 913).

Then, the cache memory control section 24 writes, into the data block stored in the cache memory, the data requested to be written from the processor unit 1, sets D bit 9a of the block of the buffer address array to '1' (step 906) and terminates the process.

If there is no empty block into which the data block is to be read from the main storage 5, the cache memory control section 24 determines, by the ordinary algorithm, the data block to be written from the cache memory.

If F bit 8a of the block to be written is '1', namely, indicates store-through, the control section 24 sets V bit 7a of the block to '0' to delete the registration of the cache memory to thereby form an empty block (step 908). The control section 24 also requests the main storage control section 4 to delete the registration of the front address array of the block.

If F bit 8a of the block to be written is '0', namely, indicates store-in, the cache memory control section 24 then examines D bit 9a. If D bit 9a is '0', the data of the block are identical with the data corresponding to the block of the main storage 5; therefore, the control section 24 sets V bit 7a of the block to '0' to delete the registration of the cache memory to form an empty block (step 909). The control section 24 also requests the main storage control section 4 to delete the registration of the front address array of the block.

If D bit 9a is '1', the data of the block are modified on the cache memory, and this modification is not reflected on the main storage 5. Therefore, the cache memory control section 24 requests the main storage control section 4 for a writing request of the block, writes it into the main storage 5, then sets V bit 7a to '0', deletes the registration of the cache memory, and form an empty block (steps 910).

After having formed an empty block, the cache memory control section 24 executes the process in the case where there is an empty block, stores the requested data block in the cache memory, writes the data, which are requested to be written by the processor unit, into the data block stored in the cache memory, sets D bit 9a of the block of the buffer address array to '1', and terminates the process.

Subsequently, The block in which D bit 9a has been set to '0' in this process, is written into the main storage 5 according to the ordinary replacement algorithm.

The operation of the cache memory control section 24 when it has received a writing-back request from the main storage control section 4 and also when it has received a request for deleting the registration of data block.

Figure 10:
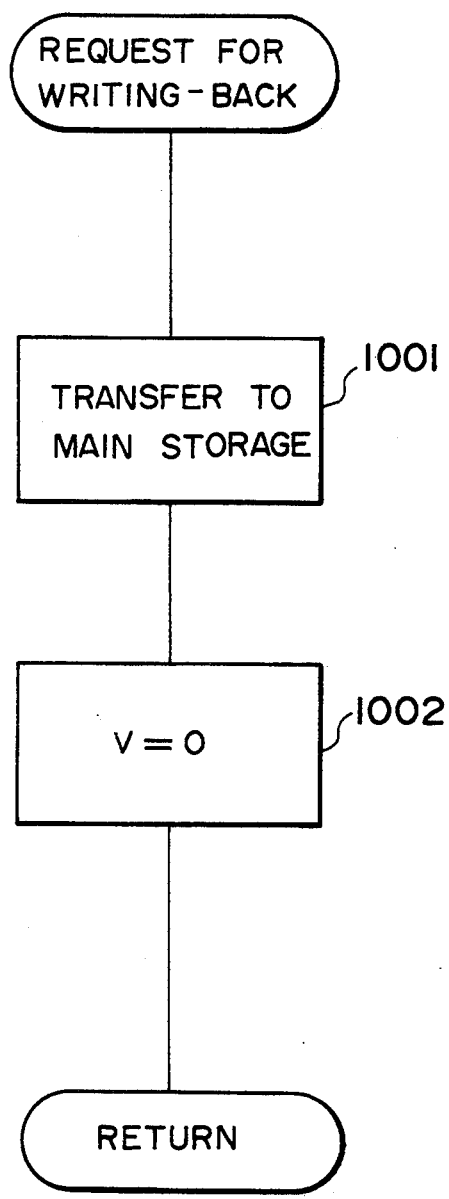
Figure 11:
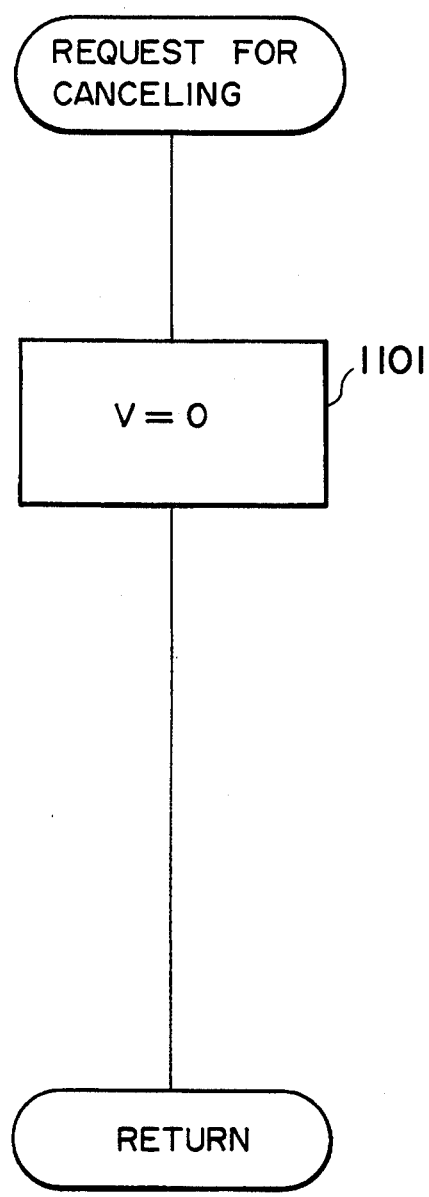

FIG. 10 shows the flow of operation of the cache memory control section 24 when it has received a writing-back request, and FIG. 11 shows the flow of operation of the cache memory control section 24 when it has received a request for deleting the registration of data block.

Firstly, the operation of the cache memory control section 24 when it receives a writing-back request will be discussed with reference to FIG. 10. Upon receipt of a writing-back request, the cache memory control section 24 makes a request for writing by the store-in attribute, transfers the requested block to the main storage 5 (step 1001), sets V bit 7a of the transferred block of the buffer address array to '0', and deletes the registration of the block (step 1002).

Secondly, the operation of the cache memory control section 24 when it receives a request for deleting the registration of data will be discussed with reference to FIG. 11. Upon receipt of a request for deleting the registration of data, the cache memory control section 24 sets V bit 7a of the requested block of the buffer address array to '0', and deletes the registration of the block (step 1101). Likewise, when the main storage control section 4 receives from the cache memory control section 24 a request for deletion the registration of data block, the main storage control section 4 sets V bit 7a of the requested block of the front address array corresponding to the requesting processor unit 1 to '0' to delete the registration of the block.

As described above, according to the first embodiment, it is possible to control the data and the block as of the storage space, which are highly commonly usable by the multiple processor units, by store-through system, and to control the remaining blocks by store-in system.

Further, according to the first embodiment, since change-over of control of the cache memory is automatically performed by the store system determining circuit 35, the user can use this information processing apparatus in the same manner as heretofore. Namely, it is possible to realize that the processing speed of the information processing apparatus is increased by change-over of control of the cache memory, with keeping the conventional software property effective.

In this embodiment, the store identification code 32b is set as store-through, and cache memory control is performed on the data by the store-through system, if the kind of an instruction for requesting the operation of the stored data is to read data comprising a program such as instruction fetching, if the logical address of the data contained in the instruction is on a common segment or if the read space control bit indicates a primary space access. However, depending on the type of the information processing apparatus, cache memory control may be performed on the data, with the store identification code 32b as store-through, under one or two of the above-mentioned three conditions, or according to, for example, the parameter indicating the degree of common usability of data. The individual condition and parameter should preferably be programmably switchable.

Further, suitable cache memory control may be performed over, for example, jobs to be executed dynamically.

A second embodiment of this invention will now be described, in which the cache memory can be controlled as switching is made between the store-in system and the store-through system for every page to access.

The information processing apparatus of the second embodiment is identical in construction with that of the first embodiment, except that the logical/physical address translation section 23 is different from that of the first embodiment in order that the store-in system and the store-through system are switchable for every page.

Figure 4:
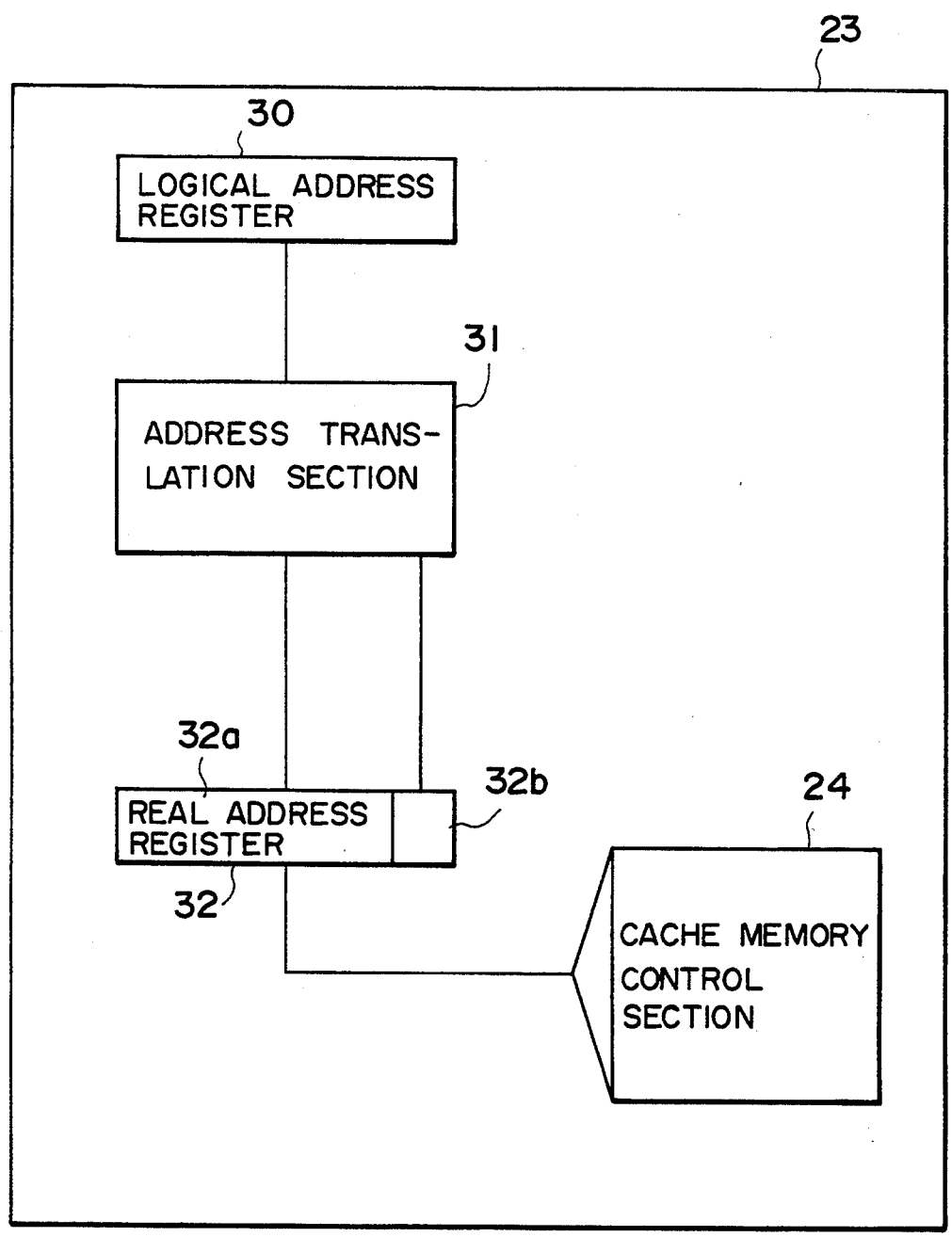
FIG. 4 is a block diagram showing a modified logical/physical address translation section according to a second embodiment.

FIG. 4 shows the construction of the logical/physical address translation section 23 according to the second embodiment. Like reference numerals designate similar elements throughout the first and second embodiments. In FIG. 4, reference numeral 30 designates a logical address register; 31, an address translator; 32, a real address register 32 in which the translated physical address is stored.

Figure 5:
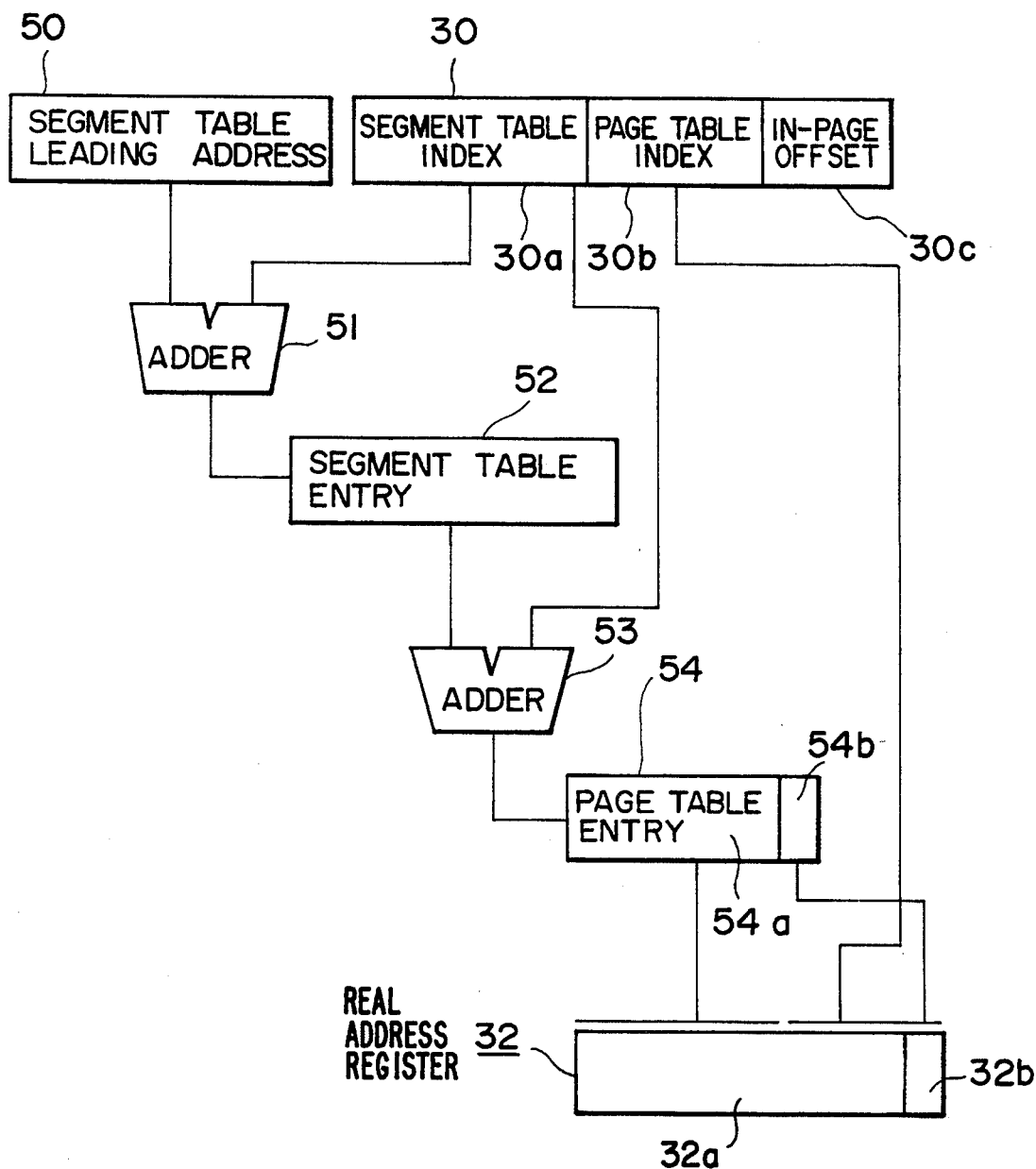
FIG. 5 is a block diagram showing an address translator of the second embodiment.

FIG. 5 shows the construction of the address translator 31 according to the second embodiment. In FIG. 5, reference numeral 30 designates a logical address register, and the logical address being composed of a segment table index 30a, a page table index 30b and an in-page offset 30c.

Reference numeral 50 designates a leading end address of a segment table 52 for easy explanation; 51, 53, adders; 52, a segment table entry in which the page table offset corresponding to the segment table index 30a is stored at the provided virtual space; and 54, a page table entry in which the physical address corresponding to the page table address is stored. In the page table entry 54, a store identification code 54b indicating the store-in or store-through attribute has previously been stored for every page.

In the real address register 32, there are stored real addresses including an upper address, which is a physical address corresponding to the page table address which is a sum in the adder 53, and a lower address, which is the in-page offset 30. Further, the attribute of page stored in the page table entry 54 is stored as a store identification code.

The operation of the second embodiment will now be discussed in connection with FIG. 4. In the processor unit 1, when an instruction requesting for data operation is issued, a logical address contained in the instruction and storing the data is set in the logical address register 30. The logical address set in the logical address register 30 is translated into a physical address by the address translator 31 and is set in the real address register 32. At that time, the store-in or store-through attribute of the page associated with the data is stored as the store identification code 32b.

The operation of the address translator 31 will now be discussed in connection with FIG. 5. When a logical address is set in the logical address register 30, the logical address is added with the segment leading address. Then with this sum as a key, the segment table entry is retrieved to obtain a page table offset corresponding to the segment table index 30a.

Then, from the page table address in which the resulting page table offset is added with the page table index 30b, the page table entry 54 is retrieved, and a physical address corresponding to the page table address and the store-in or store-through attribute of the page to which the data belong are retrieved.

Real addresses comprising an upper address, which is a physical address corresponding to the logical page table address, and a lower address which is the in-page offset 30c are set in the real address register 32. The attribute of store-in or store-through is also set as the store identification code 32b in the real address register 32. By the foregoing procedures, like the first embodiment, it is possible to set the store identification code and the physical address corresponding to the logical address in the real address register 32.

The subsequent procedures will be realized in the same manner as the first embodiment. According to the second embodiment, by previously setting the attribute of each page of the page table entry, for example, common pages in store-through and the other pages in store-in, it is possible to control, in units of pages, the data highly commonly usable between the separate processor units and the block of storage space by the store-through system, and the remaining blocks by the store-in system.

In the second embodiment, the invention is carried out on the information processing apparatus in which the virtual storage spaces are designated by segment and page. Alternatively, the invention can also be realized similarly in another information processing apparatus in which the virtual storage spaces are designated without segment, in which case the process concerning the segment in the second embodiment will be unnecessary. Further, in the second embodiment, the data highly commonly usable between the separate processor units and the block of the storage space are controlled, in units of pages, by the store-through system, while the remaining blocks are controlled, in units of pages, by the store-in system. In an alternative way, by previously setting the attribute of each segment in the segment table entry, the store-through system and the store-in system may be switched in units of segments. The unit of the storage spaces to be switched between the store-through system and the store-in system may be programmably changed.

In the first and second embodiments, the information processing apparatus has two processor units. Alternatively, the information processing apparatus may has three or more processor units.

This invention can also be realized in an information processing apparatus which does not use the multiple virtual storage space system, in which case the process concerning a primary space and a secondary space will be unnecessary.

According to the foregoing embodiments, in the information processing apparatus using a multiple-processor system, it is possible to suitably control the cache memory, without lowering the performance of the multiple-processor system, even under various circumstances.

What is claimed is:

1. An information processing apparatus comprising:
   (a) two or more processor units each including a cache memory and a processor which accesses stored data via the cache memory, and
   (b) a main storage coupled to said processor units;
   (c) each of said processor units including (i) a control status register for storing information about the processor's control status; (ii) discriminating means for discriminating, based on information in said control status register when data is loaded into the cache memory from said main storage, which one of store-through and store-in systems is to be used to write data in said cache memory, said discriminating means giving to the data an attribute indicating the store-through or the store-in system in accordance with the discriminating results by said discriminating means, and (iii) writing means for writing the loaded data in the cache memory using the discriminated one of said systems.

2. A cache memory control method for use in an information processing apparatus composed of a main storage, for storing a plurality of blocks of data, and a plurality of processor units, said processor units each including a processor having a control status register for storing information about the processor's control status, a private cache memory associated with said processor and said main storage, and a cache memory controller associated with said processor and said private cache memory, said method comprising the steps of:
   a) providing a read-request for reading a block of data from one of said processors to the cache memory controller associated therewith, said read-request including information indicating an address for designating a storage location of the main storage where the data to be read is stored;
   b) in the cache memory controller which has received said read-request from the associated processor, loading the block of data from a storage location of said main storage, designated by the address information included in said read-request, into a storage location of the associated private cache memory if said block of data is not already present in the private cache memory, discriminating, based on information in said control status register, whether the requested data is to be controlled using a store-in system or a store-through system, and storing a flag indicating the discriminated system in relation to the storage location of the associated private cache memory where said block of data was loaded; and
   c) updating a block of data stored in said main storage with a corresponding block of data stored in the private cache memory associated with said cache memory controller using a store-through system if the stored flag in said cache memory controller related to the storage location of the private cache memory where said corresponding block of data is stored indicates that said block of data is to be controlled using a store-through system, and updating said block of data stored in said main storage using a store-in system if the stored flag in said cache memory controller related to the storage location of the private cache memory where said block of data is stored indicates that the block of data is to be controlled using a store-in system.

3. A cache memory control method according to claim 2, in which said main storage includes a common area to be utilized by a plurality of said processors and a plurality of private areas, each private area corresponding to one of said processors to be used exclusively by the corresponding processor; and said discriminating step comprising discriminating that said data block is to be controlled using said store-through system if said information in the control status register indicating the data requested by the read-request is stored in said common area, and discriminating that said data block is to be controlled using said store-in system if said information in said control status block indicating the data block is stored in a private area.

4. A cache memory control method according to claim 2, wherein said discriminating step comprises discriminating that the data block is to be controlled using said store-through system if said information in the control status register is program code data, and discriminating that said data block is to be controlled using said store-in system if said information in said control status register indicating the data is not program code data.

5. A cache memory control method according to claim 4, in which said main storage is divided into a plurality of pages or segments, each of said pages or segments including a plurality of blocks of data; and in which said discriminating step comprises discriminating according to the identity of the page or segment including the data requested by the read-request, said identity being indicated by said information in said control status register.

6. An information processing apparatus comprising:
(a) a main storage for storing a plurality of data; and
(b) a plurality of processor units each including a processor, a private cache memory coupled to said processor, and a cache memory controller which controls said cache memory and is coupled to said cache memory and said processor;
1) each processor comprising:
   a) means for generating a read-request for reading data from said main storage, said read-request including information indicating whether the data requested by the read request is to be controlled using a store-through system or a store-in system;
   b) a control status register for storing information about the processor's control status; and
   c) means for outputting the generated read-request to the cache memory controller associated with that processor; and
2) each cache memory controller comprising:
   a) means for storing a plurality of flags, each flag corresponding to a respective one of the data stored in the private cache memory associated with the cache memory controller and each indicating whether the corresponding data is to be controlled using the store-through system or the store-in system;
   b) means for loading data requested by a received read-request from said main storage into the cache memory associated with the cache memory controller if the requested data is not present already in the associated cache memory;
   c) means for setting the flag corresponding to the data loaded in the associated cache memory according to said information, included in the received read-request which caused the loading, in said control status register; and
   d) means for controlling an operation of updating a storage location of said main storage with the data stored in a corresponding storage location of the cache memory associated with the cache memory controller using the store-through system if the flag corresponding to the data stored in said corresponding storage location of the cache memory indicates that the data is to be controlled using the store-through system, and controlling said updating operation using said store-in system if said stored flag corresponding to the data stored in said corresponding storage location of the cache memory indicates that the data is to be controlled using the stored-in system.

7. An information processing apparatus according to claim 6, wherein:
said means for setting the flag includes means for setting the flag indicating that the data requested by the read request is to be controlled using the store-through system if the information in said control status register indicates that the data is program code data, and for setting the flag indicating that the data requested by the read request is to be controlled using the store-in system if the information in said control status register indicates that the data is not program code data.

8. An information processing apparatus according to claim 6, wherein:
said main storage includes a common memory area utilized for a plurality of said processors and a plurality of private memory areas, each private memory area respectively corresponding to one of said processors and being utilized exclusively for the corresponding processor; and
said means for setting the flag includes means for setting the flag which indicates that the data requested by the read-request is to be controlled using the store-through system if the information in said control status register indicates that the data is stored in said common memory area of the main storage and for setting the flag which indicates that the data requested by the read-request is to be controlled using the store-in system if the information in said control status register indicates that the data is stored in the private area for the processor which issued the read-request.

9. An information processing apparatus for performing a plurality of processes, said information processing apparatus comprising:
(a) a main storage for storing a plurality of data divided into a plurality of blocks of data; and
(b) a plurality of processor units each including a processor for executing a process or processes, a private cache memory coupled to said processor and a cache memory controller which controls said cache memory and is coupled to said cache memory and said processor;

1) each processor comprising:
   a) means for generating a read-request for reading data from said main storage, said read-request including information indicating whether the data requested by the read request is to be controlled using a store-through system or a store-in system;
   b) a control status register for storing information about the processor's control status; and
   c) means for outputting the generated read-request to the cache memory controller associated with that processor; and 2) each cache memory controller comprising:
   a) means for loading a block of data including the data requested by a received read-request from said main storage into the cache memory associated with the cache memory controller if the requested block of data is not present already in the associated cache memory;
   b) means for storing a plurality of flags each of which corresponds to a respective one of the blocks of data stored in the cache memory associated with the cache memory controller, each of said flags indicating whether the corresponding block of data is to be controlled using said store-through system or store-in system;
   c) means for setting the flag corresponding to the block of data loaded in the associated cache memory according to said information included in the received read-request which caused the loading; and
   d) means for controlling an operation of updating a storage location of said main storage with the block of data stored in the corresponding storage location of the cache memory associated with the cache memory controller using the store-through system if the flag corresponding to said corresponding block of data stored in said corresponding storage location of the cache memory indicates that the block of data is to be controlled using the store-in system.

10. An information processing apparatus according to claim 9, wherein:
said means for setting the flag includes means for setting the flag indicating that the data requested by the read request is to be controlled using the store-through system if the information in said control status register indicates that the data is program code data and for setting the flag indicating that the data requested by the read request is to be controlled using the store-in system if the information in said control status register indicates that the data is not program code data.

11. An information processing apparatus according to claim 9, wherein:
at least part of said main storage is divided into a plurality of pages, each of said pages including a plurality of said blocks of data; and
said means for setting the flag includes means for setting the flag which indicates that the data requested by the read-request is to be controlled using a store-through system or a store-in system according to the page including the data requested by the read-request, said page being indicated by the information in said control status register.

12. An information processing apparatus according to claim 9, wherein:
at least part of said main storage is divided into a common segment utilized for a plurality of said processes and a plurality of private segments, each of said private segments respectively corresponding to one of said processes and being utilized exclusively for the corresponding process; and
said means for setting the flag includes means for setting the flag which indicates that the data requested by the read-request is to be controlled using the store-through system if the information in said control status register indicates that the segment including the requested data is said common segment, and for setting the flag which indicates the data requested by the read-request is to be controlled using the store-in system if the information in said control status register indicates that the segment including the requested data is a private segment.

13. An information processing apparatus according to claim 9, wherein:
at least a part of said main storage is divided into a primary space for storing a program utilized for a plurality of said processes and a plurality of secondary spaces, each of said secondary spaces respectively corresponding to one of said processes and being utilized exclusively for the corresponding process; and
said means for setting the flag includes means for setting the flag which indicates that the data requested by the read-request is to be controlled using the store-through system if the information in said control status register indicates that the space including the requested data is said primary space, and for setting the flag which indicates the data requested by the read-request is to be controlled using the store-in system if the information in said control status register indicates that the space including the requested data is a secondary space.

14. An information processing apparatus according to claim 9, further comprising a main storage control unit associated with said main storage, said main storage control unit including:
1) means for storing a plurality of flags, each flag corresponding to a respective one of the blocks of data stored in the main storage, each of said flags indicating whether the corresponding block of data is to be controlled using the store-through system or the store-in system;
2) means for controlling the block of data in said main storage which corresponds to a block of data being loaded in one cache memory, but not into another cache memory, if the stored flag corresponding to the block of data indicates that the corresponding block of data is to be controlled using the store-in system; and
3) means for nullifying a block of data in a cache memory which corresponds to a block of data updated in main storage, if the stored flag corresponding to the updated block of data indicates that the corresponding block of data is to be controlled using the store-through system.

15. An information processing apparatus according to claim 1, wherein the information stored in said control storage register indicates an attribute of the data loaded into the cache memory.

16. An information processing apparatus according to claim 1, wherein the information stored in said control storage register indicates an attribute of the storage area.

17. An information processing apparatus according to claim 16 further comprising:
   a main storage control unit associated with said main storage, said main storage control unit including means for giving to data stored in the main storage and loaded into any one of the cache memories an attribute corresponding to the attribute given by said discriminating means.

18. An information processing apparatus according to claim 1 further comprising:
   a main storage control unit associated with said main storage, said main storage control unit including means for giving to data stored in the main storage and loaded into any one of the cache memories an attribute corresponding to the attribute given by said discriminating means.

19. An information processing apparatus according to claim 6, further comprising a main storage control unit associated with said main storage, said main storage control unit including means for storing a plurality of flags, each flag corresponding to a respective one of the blocks of data stored in the main storage, each of said flags indicating whether the corresponding block of data is to be controlled using the store-through system or the store-in system.

* * * * *